US006246146B1

(12) United States Patent
Schiller

(10) Patent No.: US 6,246,146 B1
(45) Date of Patent: Jun. 12, 2001

(54) AXIAL FIELD ELECTRIC DIRECT CURRENT MOTOR AND GENERATOR

(76) Inventor: Helmut Schiller, Scholzenvietel 7, D-64625 Bensheim (DE)

(*) Notice: Subject to any disclaimer, the term of this patent is extended or adjusted under 35 U.S.C. 154(b) by 0 days.

(21) Appl. No.: 09/171,406

(22) PCT Filed: Apr. 12, 1997

(86) PCT No.: PCT/EP97/01842

§ 371 Date: Jan. 4, 1999

§ 102(e) Date: Jan. 4, 1999

(87) PCT Pub. No.: WO97/40572

PCT Pub. Date: Oct. 30, 1997

(30) Foreign Application Priority Data

Apr. 18, 1996 (DE) .............................. 196 15 219
May 21, 1996 (DE) .............................. 196 20 291

(51) Int. Cl.[7] .......................... H02K 16/04; H02K 23/54
(52) U.S. Cl. .................... 310/268; 310/237; 310/136; 310/151; 310/154; 310/241
(58) Field of Search .................. 310/268, 237, 310/136, 140, 148, 241, 239, 151, 154

(56) References Cited

FOREIGN PATENT DOCUMENTS

| 31 40 437 | * | 4/1983 | (DE) | .................................... | 310/268 |
| 164827 | * | 12/1985 | (EP) | .................................... | 310/268 |
| 619638 | * | 10/1994 | (EP) | .................................... | 310/268 |
| 95 17779 | * | 6/1995 | (WO) | .................................... | 310/268 |

\* cited by examiner

Primary Examiner—Karl I. Tamai
(74) Attorney, Agent, or Firm—Norris, McLaughlin & Marcus P.A.

(57) ABSTRACT

An electrical direct current machine (10), which can be operated as a motor and as a generator and works according to the axial field principle. The machine has a rotor (26), which is rotatably mounted in a housing (12), has a plurality of electromagnets mounted at a distance from the axis of rotation, with in each case one coil winding (34) of a coil core (32) carrying one or more electrical conductors, the ends of the electrical conductors, forming the coil, being taken radially inward and being connected in an electrically conductive manner with, in each case, assigned contact elements having in each case one contact surface and, taken together, forming a commutator, on which contact elements sliding contacts (42) are pressed against a source or a consumer of direct current. At regular angular distances, pole faces of permanent magnets, with in each case opposite polarity in the circumferential direction, are provided consecutively on the insides of the housing end walls (14a; 14b). At uniform angular distances, pole faces of permanent magnets, which are disposed on the inner sides of the end walls (14a; 14b) of the housing opposite the end surfaces of the coil cores (32) are provided with consecutively in each case opposite polarity in the circumferential direction.

13 Claims, 4 Drawing Sheets

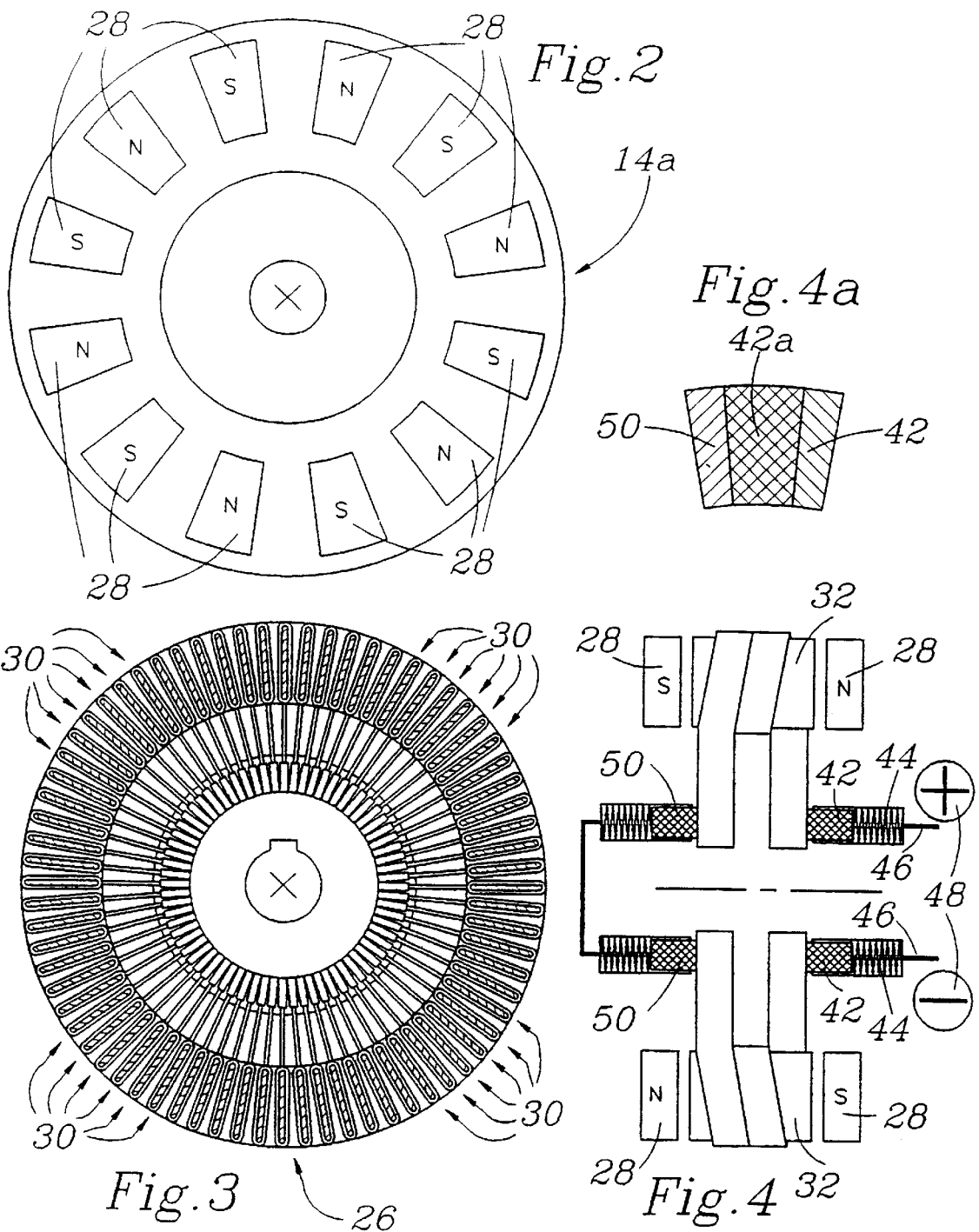

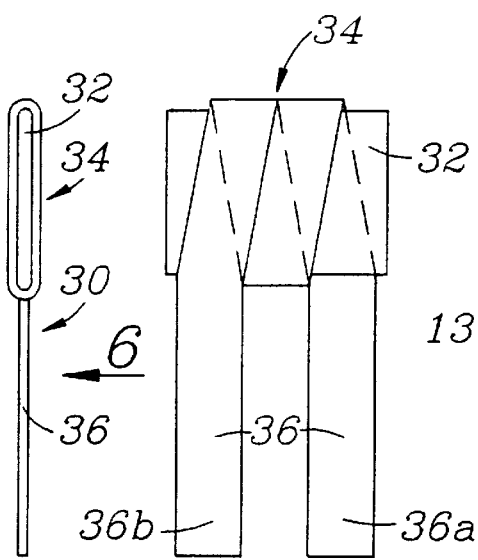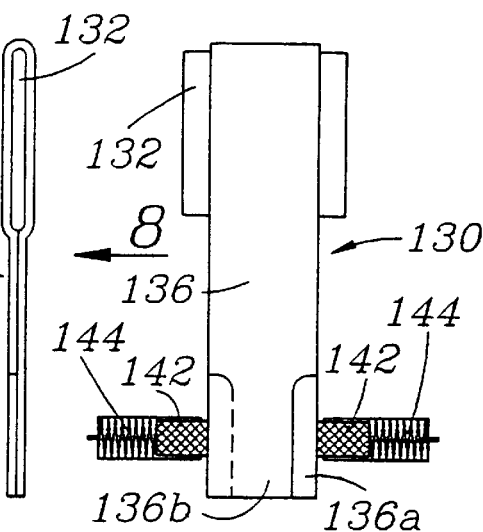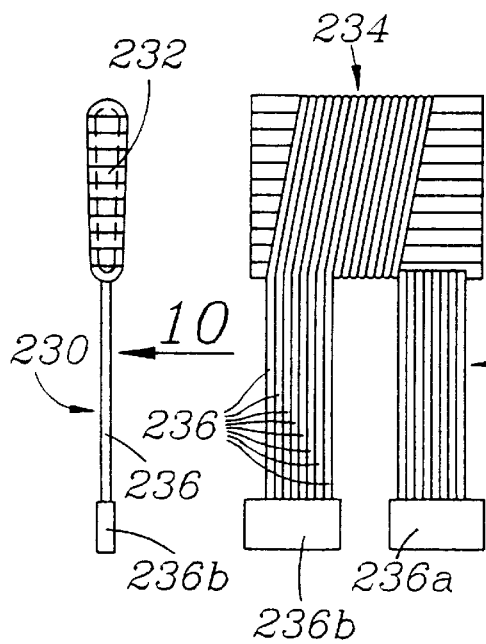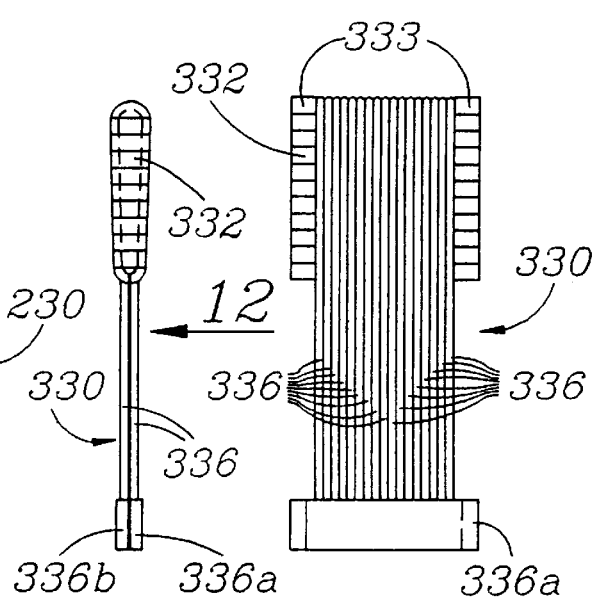

AXIAL FIELD ELECTRIC DIRECT CURRENT MOTOR AND GENERATOR

BACKGROUND OF THE INVENTION

1. Field of the Invention

The invention relates to an electric direct current machine.

2. Description of the Related Art

An electric direct current collector machine, which can be used as a motor as well as a generator, is known (for example, from DE 33 24 617 A1). For this collector machine, a rotor, carrying a plurality of non-ferrous coils of electrical conductors at uniform angular intervals on the same diameter, is rotatably mounted in one housing. On the inner sides of the end surface of the housing, rigidly disposed permanent magnets of polarity, differing consecutively in the circumferential direction, are located opposite to and on either side of the coils. The conductors, forming the coils, are connected in turn to commutator contact surfaces, which rotate with the rotor and are insulated electrically from one another and on which sliding contacts, which are provided in the housing and insulated from the wall of the housing and which are connected conductively with external electrical connections, are pressed. When connected to an electric direct current source, the machines, so constructed, act as a motor. On the other hand, when the rotor shaft is driven, they act as a generator, that is, electrical direct current can be collected from their terminals. These known direct current machines find use, for example, as small, very compact motors of low output, for example, as motors for driving recording devices for video signals. Because of the special arrangement of the rotor coils and the permanent magnets and the therefrom resulting course of the interacting fields of the permanent magnets and the rotor coils, such motors are also referred to as axial field machines. Because of the good efficiencies that can be attained with them and because of the basically good possibilities of regulating them, such axial field machines, with larger dimensions and a correspondingly higher output, have also been proposed, for example, as driving motors for vehicles (WO 95/17779).

SUMMARY OF THE INVENTION

It is an object of the invention to further the development of such an electric direct current machine with higher outputs, which makes it also suitable as driving motors for vehicles, so that the machine, while having a simple and therefore cost-effective construction, achieves a high efficiency.

Pursuant to the invention, this objective is accomplished by an electric direct current machine with a rotor, which is rotatably mounted in a housing, has a plurality of electromagnets mounted at a distance from the axis of rotation, with in each case a coil winding on a coil core carrying one or more electrical conductors, the ends of the electrical conductors, forming the coil, being taken radially inward and being connected in an electrically conductive manner with, in each case, assigned contact elements having in each case one contact surface and, taken together, forming a commutator, onto which contact elements sliding contacts are pressed, which are held in the housing and can be connected to a source of direct current or to a direct current consumer, and with pole faces of permanent magnets, which are disposed at regular angular distances on the inner sides of the end walls of the housing opposite the end faces of the coil cores and, consecutively in the circumferential direction, have opposite polarities, each coil core forming with the associated coil winding a separately produced electromagnet component, which is held in a hub support, which is connected with the shaft of the rotor so that there can be no mutual rotation, the pole faces of the permanent magnets extending so that they overlap in each case several opposite coil cores, the two sliding contacts of the commutator, assigned to a radially external permanent magnet, extending so far in the circumferential direction, that they overlap the contact surfaces, of in each case, about half of the contact elements assigned to a pole face of a permanent magnet, and contact surfaces being provided, which are offset to the contact surfaces of the contact elements forming the commutator and connected electrically with the respective contact surfaces on the commutator side and against which sliding contacts are pressed, which essentially correspond in the circumferential extension to the sliding contacts of the commutator and in turn are connected electrically with one another in each case in pairs.

The prefabrication of the electromagnet components and their subsequent mounting in the hub support ensures the desired simple construction and the cost-effective mounting. Due to the refinement that in each case several electromagnet components are assigned to each permanent magnet, it is possible to energize the electromagnet component, which runs into the field of a permanent magnet when the rotor is running, in such a manner, that they have an opposite polarity and thus are attracted by the electromagnet in the circumferential direction. As soon as the coil core of the respective electromagnet component is then aligned centrally to the permanent magnet, the polarity of the coil core is reversed over the contact surfaces opposite to the commutator contact surfaces, as a result of which the electromagnet component then has the same polarity as the opposite permanent magnet and is thrust further in the direction of rotation.

At the same time, it may be appropriate if the contact surfaces of the sliding contacts of the commutator and the contact surfaces of the sliding contacts, which are assigned to the commutator sliding contacts and connected electrically with one another in pairs, can be shifted relative to one another by a specified amount in the direction of rotation of the rotor. In this way, the effective contact surface of sliding contacts of the commutator in the circumferential direction and, with that, the characteristics of the direct current machine can be changed.

Preferably, the coil cores have the shape of essentially rectangular disks, which extend radially and parallel to the rotor axis and the edge regions of which protrude with the radially extending end edges over the coil winding carried by them. These protruding edge regions of the coil cores then act—particularly if they are aligned in the radial direction—like radial blades of a blower, which enables a motor to be cooled by aspirating from the surroundings in the radially inner region of the housing and blowing it out in the radially outer region of the housing. The radial and disk-shaped construction of the coil cores furthermore makes it possible to provide a large number of electromagnet components on a specified diameter, especially if the machine in question is developed on the axial field principle with a relatively large diameter and does not extend very far axially. Moreover, an optimum utilization of space is attained if the coil cores of a sectional plane, placed at right angles through the rotor shaft, has a cross section diverging from the radially inner boundary edge to the radially outer boundary edge.

The electrical conductors of an electromagnet component can be formed from an extended electrical conductor, such as a metal strip of a copper alloy, which is passed in at least a half turn around the coil core. A rotor, assembled from such electromagnet components, then has sufficient inherent stability, that is, it requires no or only a skeleton-like rotor framework, so that air can flow well through the electric conductors and the rotor can thus be cooled.

Alternatively, the electrical conductors of the electromagnet components can also be formed from a plurality of electrically conducting metal wires, which lie next to one another and are passed around the coil core in at least half of a winding.

The coil cores of the electromagnet components can be disposed at a radial distance from and essentially parallel to the axis of rotation of the rotor.

Alternatively, the coil cores of the electromagnet components can also be disposed at a radial distance from and inclined at such an angle to the axis of rotation of the rotor, that their opposite end faces, pointing to the permanent magnets, are offset to one another in the circumferential direction. At the same time, the distance in the radial direction of the opposite end faces of the coil cores from the axis of rotation of the rotor can be the same.

On the other hand, the formation can also be such that the coil cores of the electromagnet components are disposed at a radial distance from and inclined at such an angle to the axis of rotation of the rotor, that their opposite end surfaces, pointing towards the permanent magnets, are at a different distance, in the radial direction, from the axis of rotation of the rotor.

A further development serves for the stabilization of the electromagnet components in the rotor as well as for the formation, laterally to the end walls of the housing, of closed chambers, through which air can flow radially for cooling as if driven by a blower. For this further development, the coil cores of all electromagnet components are connected to one another by, on each side in each case, one ring disk of magnetically not magnetic material, which is provided in the end regions in the coil core close to the end faces. In this connection, the opposite end faces of the coil core advisably pass through the ring disk assigned in each case, so that the gap between the end faces of the coil core and the pole faces of the permanent magnets can be kept as small as possible.

An appropriate and advantageous development of the permanent magnets is obtained if, in each case, two pole faces of different polarity of the permanent magnets, which are consecutive in the circumferential direction and face the rotor, are formed from the two parallel pole faces, pointing into the interior of the housing, of a permanent magnet shaped in the form of a horseshoe magnet.

Moreover, this permanent magnet, formed in the shape of a horseshoe magnet, can be formed by the end faces, facing the rotor, of soft magnetic pole shoes, which are passed through the end walls of the housing consisting of a non-magnetic material and which are coupled outside of the respectively assigned end wall of the housing to in each case one pole of a permanent magnet. The permanent magnets may then be formed simply as conventional rod magnets.

In this connection, the pole shoes are advantageously formed from packages of transformer sheets held against one another in tight contact yet insulated electrically, in order to minimize losses due to eddy currents. If the permanent magnets are formed from pole shoes with a rod magnet, it is advisable to hold the opposite ends of the rod in, in each case, one seat in the respective pole shoe formed at least partially in a complementary fashion to the end of the rod.

One embodiment of the pole shoe, which can be adjusted parallel to the axis of rotation of the rotor and fixed within a specified adjustment range, in the respectively assigned end wall of the housing, permits the distance between the end faces of the coil cores of the electromagnet components of the rotor and the pole faces of the permanent magnets, formed by the end faces of the pole shoes within the housing, to be adjusted to a barely still permissible slight extent and, in this way, makes it possible to optimize the efficiency of the machine itself.

BRIEF DESCRIPTION OF THE DRAWINGS

The invention is explained in greater detail in the following description of several examples and in conjunction with the drawing, in which FIG. 2 shows a view of the inside of an end wall of the housing, carrying the permanent magnets, seen in the direction of arrow 2—2 in FIG. 1, FIG. 3 shows a view of the rotor of the direct current machine, built up from a plurality of electromagnet components, seen in the direction of the arrow 3—3 in FIG. 1, FIG. 4 shows a diagrammatic representation of the pole reversal circuit of successive electromagnet components of the rotor of an inventive direct current generator, FIG. 4a shows a diagrammatic representation of mutually assigned sliding contacts of a pole reversal circuit, when looking towards their contact faces, FIG. 5 shows a side view of a first example of an inventive electromagnet component, FIG. 6 shows a view of the electromagnet component, seen in the direction of arrow 6 in FIG. 5, FIG. 7 shows a side view of a modified example of an electromagnet component, FIG. 8 shows a view, shown in the direction of arrow 8 in FIG. 7, FIG. 9 shows a modified electromagnet component, for which, instead of strip-shaped metal conductors, several parallel wires have been provided as a coil winding for the one on the coil core, FIG. 10 shows a view, seen in the direction of arrow 10 in FIG. 9, FIG. 11 shows a side view of a modified electromagnet component, also built up using a plurality of parallel metal wires arranged next to one another, FIG. 12 shows a view seen in the direction of the arrow 12 in FIG. 11.

DESCRIPTION OF THE PREFERRED EMBODIMENTS

Figure 1:
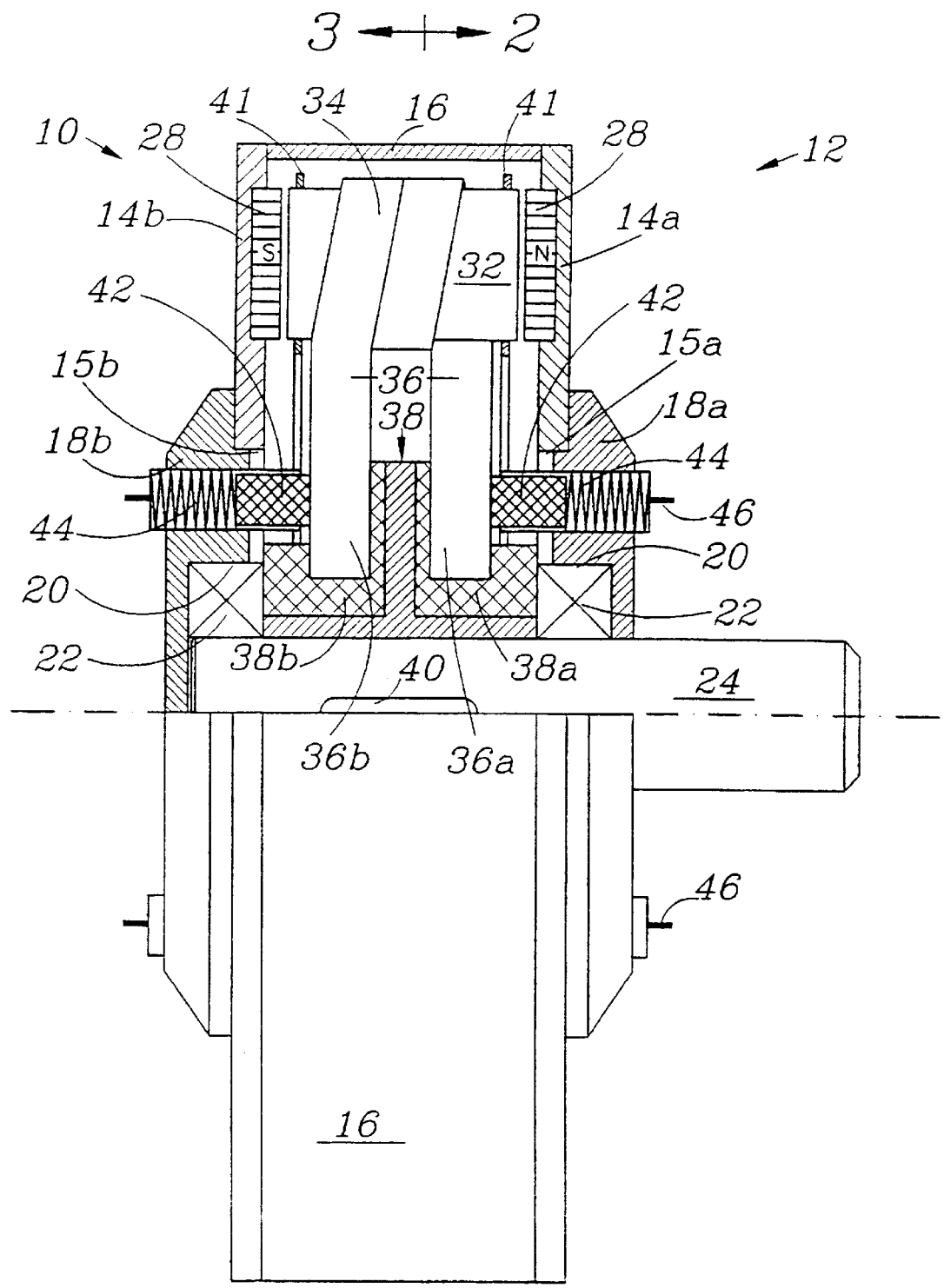
FIG. 1 shows, in a so-called half section, that is, in the lower half in side view and in the upper half as a section along a radial plane, an example of a direct current machine, which is constructed in the inventive manner and shown diagrammatically.

In FIGS. 1 to 3, an example of an inventive direct current machine, which is labeled 10 as a whole and can be used as a motor and as a generator, is shown in diagrammatic representation. In the specific case, the machine 10 has a housing 12, which is relatively short in the axial direction and is composed of two disk-like housing end walls 14a, 14b of relatively large diameter and of the actual peripheral wall 16 of the housing, converted practically into a cylindrical ring of relatively small length. The end walls 14a, 14b of the housing and peripheral wall 16 of the housing are connected with one another, so that they can be dismantled, by screws or other fastening means, which are not shown.

Central passage openings 15a, 15b in the end walls 14a, 14b are closed off by the housing lid 18a, 18b, in which in each case a bearing seat 20 for a journal type radial bearing 22, in which a shaft 24 passing through the cover 18a of the housing is rotatably mounted, is formed centrally. This shaft 24 carries the rotor 26, which is held on it so that there can be mutual rotation (FIG. 3).

On the inner end faces of the end walls 14a, 14b of the housing, permanent magnets 28, placed radially at uniform angular distances as far as possible to the outside, are disposed on radii identical with respect to the center line of the housing. In the case shown (FIG. 2), the end walls 14a, 14b each carry twelve permanent magnets. Consecutive permanent magnets in the circumferential direction have opposite polarity.

The rotor 26 (FIG. 3) is assembled from a plurality of electromagnetic components 30, which are produced initially as separate, individual components. In the example shown, they comprise a total of seventy-two components 30. In FIGS. 5 and 6, such a component 30 is shown separately. Each electromagnet component 30 has a coil core 32, which is constructed as a disk of a soft magnetic material and over which a total of two windings of a metal strip, which is produced advisably from a copper alloy of high electric conductivity, are wound as a coil winding 34. In the region forming the winding on the coil core, the strip is insulated in the usual manner, for example, by a non-conductive lacquering, from the coil core and adjoining components 30. The coil core 32, in turn, is built up in the usual manner from transformer sheets, which are insulated from one another and packed to largely suppress eddy currents. The two ends 36a, 36b of the strip 36 of each electromagnet component 30 are taken radially towards the inside in the direction of the shaft 24 and held there in a hub support 38, which has, for example in the manner indicated in FIG. 1, two plastic ring objects 38a, 38b of insulating material, which are mutually offset axially and each hold one of the ends 36a or 36b of the components 30. The strip ends 36a, 36b of all electromagnet components 30 are cast into these ring objects 38a, 38b and held insulated from one another. The rotor 26 is connected, so that there can be mutual rotation, with the shaft 24 by means of a wedge connection, which is indicated, for example, in FIG. 1 by a wedge-shaped groove 40. If a suitable material of the appropriate dimension is selected for the strip 36, the rotor 26, formed by the hub support 38 and the plurality of electromagnet components, is self supporting. Alternatively, however, an additional stiffening of the rotor is conceivable by partially filling up the spaces between the radially extending conductor strips 36. The disk-shaped coil cores 32 protrude in the axial direction beyond the coil winding 34, so that, when the rotor is running, they bring about an air flow in the housing, which is directed from the inside to the outside. By means of suitable (not shown) air-supplying ducts in the end walls 14a and/or 14b and air-discharging openings in the actual housing 16, circulation of the surrounding air, automatically ensuring the cooling of the generator, is forced when the generator is running. By means of ring disks 41 of a magnetically non-conducting material, placed on either side on the regions of the coil cores 32 protruding axially beyond the coil winding 34, the circulation of the surrounding air can be concentrated on the spaces between the electromagnet components 30 and the cooling action can thus be optimized. At the same time, these ring disks 41 stabilize the electromagnet components, in that they fix them relative to one another at a specified radial distance from the axis of rotation of the rotor as well as at a distance from one another in the circumferential direction.

The electromagnet components 30 of the machine 10 are connected to an external source of direct electric current, such as accumulator or, in the event that the machine is used as a generator, to a consumer of direct current, over sliding contact 42 which, in accordance with the representation of FIG. 1, can be constructed as carbon brushes, pressed by springs 44 directly against the end edges of the radial sections of the conductor strips 36, which are not insulated. The not insulated end edges of the strips 36 of all electromagnet components 30, taken together, form the commutator at the rotor 26 of the machine 10. Alternatively, the commutator can also, of course, be formed by contact elements, which are mounted separately at the conductors forming the coil winding, in the event that this is desirable, for example, with respect to the wear of the contact surfaces. In conjunction with FIGS. 9, 10 and 11, 12, electromagnet components are described below, for which separate contact elements for the commutator are connected, for example, by welding, to the conductors forming the coil winding. From the above description of the direct current machine 10, it is clear that the permanent magnets 28, which are provided at the end walls of the housing and are opposite to the coil cores 32 of the electromagnet components 30, extend to such a degree in the circumferential direction, that more than three electromagnet components are located opposite to them at any given time. The electromagnetic components are provided with current by the commutator in such a manner, that the polarity of the coil core of an electromagnetic component entering between a pair of associated permanent magnets is opposite to that of the associated permanent magnets, so that the respective component 30 is pulled by the magnetic interactions between the permanent magnets is reached, a reversal of the polarity of the electromagnet components 30 then takes place so that a repulsion and, with that, an unavoidable further rotation of the rotor is brought about by the opposite polarization of the coil core, which then takes place. This is attained by the circuit shown diagrammatically in FIG. 4. In the drawing, two electromagnet components 30 are shown, which are offset to one another in the circumferential direction, but still assigned to the same permanent magnets in the peripheral extent, and are connected over leads 46 to the associated source of direct current 48, such as an accumulator. In this case, the sliding contacts 42 have a peripheral extent, which corresponds, at most, to half the circumferential extent of a permanent magnet 28, so that the energizing of the respective coil core 32 takes place over the respective lead 36 in the aimed-for sense in such a manner, that the respective component 30 is attracted during the first half of the entry between a pair of permanent magnets 28 belonging together. As soon as the respective coil core 32 has moved beyond the center of the momentarily opposite pair of permanent magnets 28, the flow of current from the source 48 of direct current is reversed over a pair of sliding contacts 50, which are connected electrically with one another, so that the polarity of the magnetic field, generated in the respective coil core 32, is reversed and then is equal to the polarity of the opposite pair of permanent magnets. The coil core 32 and, with that, the electromagnet component 30 are then displaced from the associated pair of magnets 28, that is, the rotor 26 receives an impulse, displacing it further in the direction of rotation.

FIG. 4a furthermore illustrates diagrammatically that the sliding contacts 42 and 50, which are assigned to one another and the contact surfaces of which are bounded approximately trapezoidally, can also be offset to one another in the direction of rotation of the rotor. In the case shown, current can flow only in the electromagnet components 30, against the commutator surfaces of which the cross-hatch region 42a is pressed, in which the contact surfaces 42 and 50 overlap. By changing the arrangement of the contact surfaces of the sliding contacts 42, 50, which are twisted relative to one another, the effective contact surface can thus be enlarged or decreased and the characteristics of the direct current machine with respect to the rpm/torque behavior can be changed and, in this manner, adapted to different requirements. Moreover, it is even possible to consider developing the possibility of a relative twisting of the sliding contacts, assigned to one another, manually or by an automatic control, variably during the operation, in order to adapt the rpm or the torque deliberately or automatically in this manner to different conditions.

In FIGS. 7 and 8, a modification, labeled 130 as a whole, of the electromagnet component 30, which has already been described and is portrayed in FIGS. 5 and 6, is shown. The electrical conductor surrounding the coil core 132 with only half a winding here, once again has the shape of a correspondingly wider strip 136 of highly conductive metal, the ends 136a, 136b of which are machined in such a manner at the respectively opposite end edges, that on each side only the end edge of one of the ends is accessible for contact with a sliding contact 142. Thus, taken together, the machined end regions 136a, 136b of the electromagnet components 130 once again form the commutator. It is important that the mutually facing inner surfaces of the conductor strip 136 are insulated from one another and from the coil core 132 by a suitable coating.

The modification of an electromagnet component 230, shown in FIGS. 9 and 10, differs from component 30 owing to the fact that, instead of the strip-shaped conductor 36 for the coil winding 234, a number of copper wire conductors 236, connected in parallel, are provided, which in the special case are taken in two windings about the coil core 232. The ends, taken radially inwards, are held in separate, metallic contact elements 236a, 236b, for example, by welding. These metallic contact elements of the electromagnet components 230 together once again form the commutator. In addition, they can also be constructed for fixing the components 230 in the hub body of the rotor. In this case, the coil core 232, in turn, is shaped from a block of transformer sheets, which are insulated from one another, stacked on top of one another and connected together by mechanical machining in such a manner, that the block expands outwards in the radial direction and thus, with respect to the cross section of the core, optimally utilizes the space available in the housing. The regions, protruding over the coil winding 234 laterally towards the outside, are enlarged compared to the region carrying the coil winding 234, so that the coil winding is secured against lateral migration on the coil core 232.

Finally, in FIGS. 11 and 12, a modification of the electromagnet component 130, labeled 330, is shown, for which, once again, the strip-shaped conductor 136 is replaced by a plurality of parallel copper wires 336. The wires, passed in tight proximity about the coil core 232 are, in turn, for example, once again soldered or welded at the ends in contact elements 336a, 336b, which protrude at opposite sides and opposite directions, so that they once again form at the end face the contact surfaces for commutator sliding contacts. The copper wires can be insulated in the usual manner by an insulating lacquering in the regions, in which they are in contact with one another and passed over the coil core 332, the insulating separating layer 332, which is to be provided between the contact elements 336a, 336b, being taken further between the two parallel copper wire sections up to the coil core 232. Aside from ensuring that the contact elements 336a, 336b and the copper wires are insulated from one another, this insulating layer can also increase the stiffness of the electromagnet component 330 as a whole. The copper wires 336 are prevented from sliding off the coil core 332 by being provided with short protruding shoulders 333 in the protruding regions.

Figure 14:
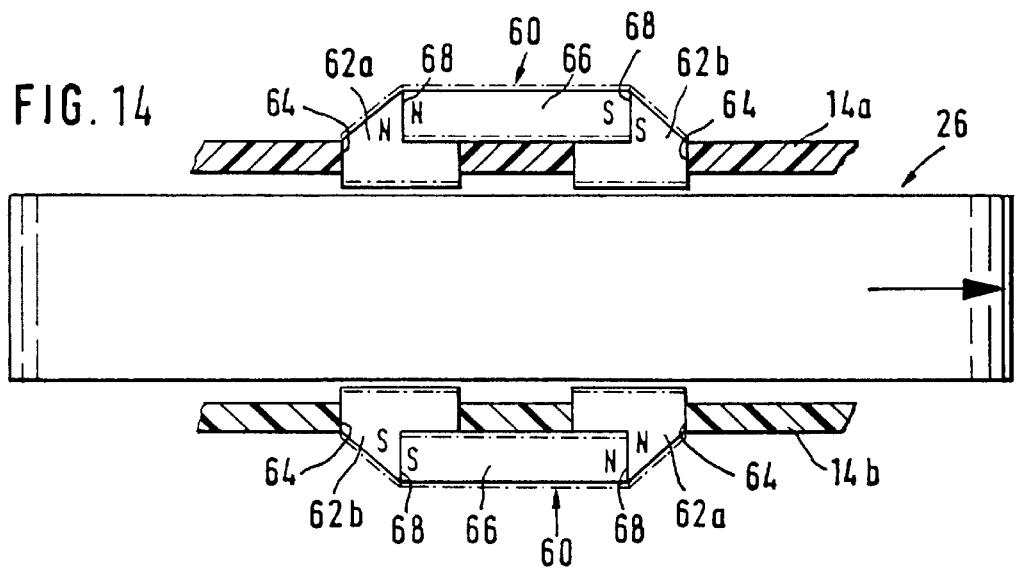
FIG. 14 shows a view of the partial sections of the end walls of the housing located within the arcs illustrated in FIG. 13 by the arrows 14—14 and of the rotor of an example of an inventive direct current machine modified from the example of FIG. 1.
Figure 13:
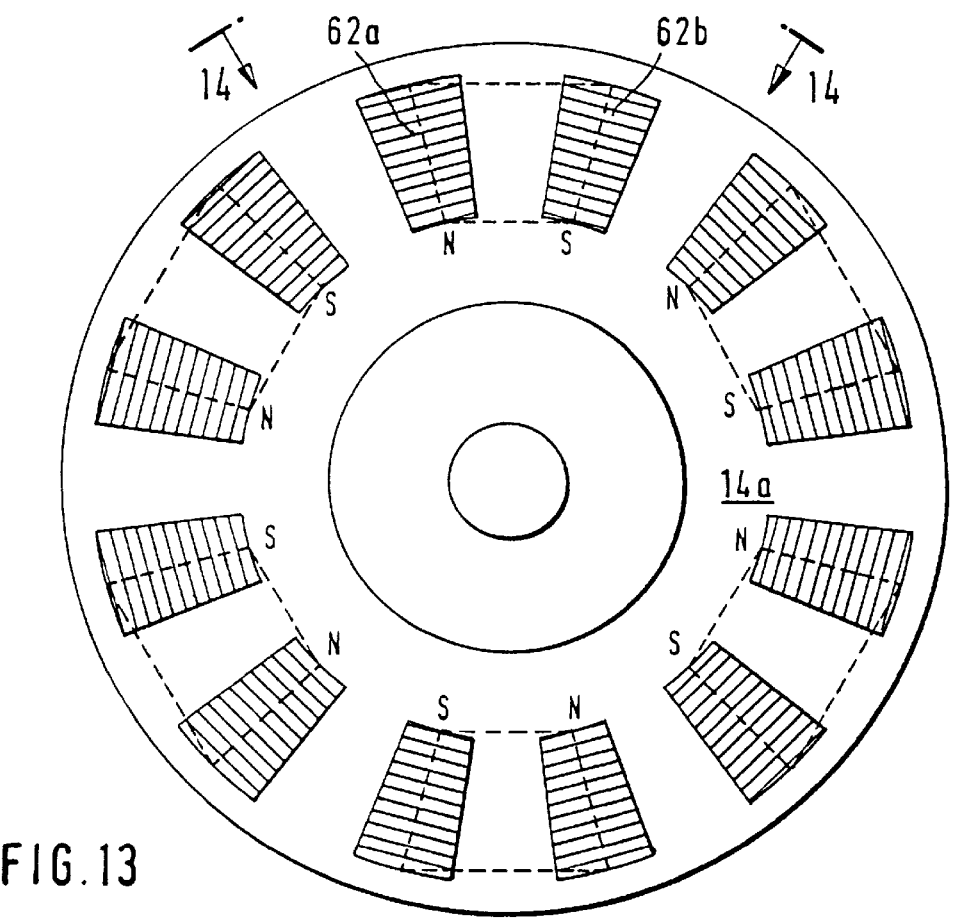
FIG. 13 shows a view, corresponding to the direction of viewing in FIG. 2, of the inside of an end wall of a housing with a modified development and arrangement of the permanent magnets

In FIGS. 13 and 14, an advantageously modified example of the embodiment of the housing 12 of the example of the inventive direct current machine, described in conjunction with FIGS. 1 to 3, is shown. The modification-made relates, particularly, to the construction of the permanent magnets. In the case of the previously described example, flat, plate-shaped permanent magnets 28 with consecutively alternating polarity are disposed on the inside of the housing end walls 14a, 14b, facing the rotor. On the other hand, in the case of the modified example, in each case two permanent magnets, following one another in the circumferential direction, are formed from the pole ends of a permanent magnet 60, shaped in the form of a horseshoe magnet. The pole ends of the permanent magnet 60, formed in the special case from separate pole shoes 62a, 62b, are themselves soft magnetic components, which are produced from layered transformer sheets and pass through suitable openings 64 in the housing end walls 14a, 14b, produced from a non-magnetic material, such as a plastic. On the outside, averted from the rotor, the two pole shoes 62a, 62b are then connected by the actual permanent magnets, which are constructed as rod magnets 66. By constructing suitable seats 68 in the pole shoes 62a, 62b, that is, seats 68 into which the ends of the rod magnet 66 fit, optimum magnetic coupling of the rod magnets to the pole shoes 62a, 62b is ensured. By a holding mechanism for the pole shoes 62a, 62b in the openings 64 of the end walls 14a, 14b, which holding mechanism is not shown in detail in the drawing and can be fixed in selectable adjustments, the gap for ensuring the best possible efficiency, which is required for constructive reasons between the end surfaces of the coil core 32 of the electromagnet components 30 and the end surfaces of the pole shoes facing these components 30, can be optimized.

It is evident that, within the scope of the inventive concept, it is possible to realize modifications and further developments of the examples described, which relate to the design of the electromagnet components as well as to the method for holding and fastening them in the hub body and to the construction of the commutator.

For example, the shape, particularly the cross-sectional shape, of the coil cores of the electromagnet components can deviate even from the disk-shaped configuration described. If a lesser number of electromagnet components are to be assembled into a rotor, simple, rod-shaped coil cores with, for example, a circular cross section can also be provided.

Deviating from the arrangement of coil cores described, which is parallel with respect to the axis of rotation of the rotor, it may also be meaningful to dispose the coil cores at a slight angle to the circumferential direction and/or inclined to the radial direction.

What is claimed is:

1. An electric direct current machine comprising:

a housing comprising two parallel end walls;

a rotor, comprising a shaft, rotatably mounted in said housing perpendicular to said end walls;

a plurality of electromagnets mounted between said end walls at a predetermined distance from the axis of rotation of said rotor, each of said electromagnets comprising one or more electrical conductors forming a coil winding on a coil core, each electrical conductor comprising at least one connect surface;

a plurality of permanent magnets, comprising opposite pole faces, disposed at regular angular distances on said end walls, said pole faces being opposite end faces of said coil core, with each consecutive permanent magnet in the circumferential direction having opposite polarities; and a plurality of contact elements assigned to said permanent magnets, each comprising at least one sliding contact having a contact surface;

wherein the ends of the electrical conductors forming the coils of said electromagnets are taken radially inward and connected in an electrically conductive manner with said assigned contact elements, thus forming a commutator, by pressing the sliding contacts of said contact elements onto the connect surfaces of said electrical conductors, said contact elements being held in the housing;

wherein said contact elements on one side of said electromagnets, forming the commutator, being for connecting to a source of direct current or to a direct current consumer, and said contact elements on the opposite side of said electromagnets being connected to one another in pairs;

wherein each of said electromagnets is held in a hub support, which is connected with the shaft of the rotor so as to insure mutual rotation;

wherein each pole face of the permanent magnets overlaps several opposite coil cores; and wherein the contact surfaces of the sliding contacts of the commutator assigned to one of said permanent magnets overlap about half of the contact surfaces of the sliding contacts of the corresponding contact elements assigned to a pole face of a corresponding permanent magnet on the opposite side of the electromagnets, said overlapping opposite contact surfaces being offset to one another.

2. The direct current machine of claim 1, wherein the overlapping opposite contact surfaces can be adjusted relative to one another in the direction of rotation of the rotor.

3. The direct current machine of claim 1, wherein the coil cores have a shape of essentially rectangular disks, said rectangular disks having an edge region which protrudes in an axial direction beyond said coils on said disks.

4. The direct current machine of claim 3, wherein the coil cores, in relation to a plane intersecting the axis of rotation of the rotor at right angles, have a cross section diverging from a radially inner boundary edge to a radially outer boundary edge.

5. The direct current machine of claim 1, wherein the electrical conductors of the electromagnet components are formed by at least one extended strip of electrically conducting metal, passed around the coil core in at least half a winding.

6. The direct current machine of claim 1, wherein the electric conductors of the electromagnet components are formed by a plurality of electrically conducting metal wires, which lie next to one another and are passed around the coil core in at least half of a winding.

7. The direct current machine of claim 1, wherein the coil cores of the electromagnet components are disposed at a predetermined radial distance from and essentially parallel to the axis of rotation of the rotor.

8. The direct current machine of claim 1, wherein the coil cores of all electromagnet components are connected to one another by, on each side in each case, one ring disk, which is made from a material that is not magnetic and is provided in the end regions of the coil core close to the end faces.

9. The direct current machine of claim 8, wherein the opposite end surfaces of the coil cores pass through the ring disk assigned in each case.

10. The direct current machine of claim 1, wherein in each case two pole faces of different polarity of the permanent magnets, consecutive in the circumferential direction and facing the rotor, are formed from the two parallel pole faces, pointing into the interior of the housing, of a permanent magnet shaped in the form of a horseshoe magnet.

11. The direct current machine of claim 10, wherein the end faces of the permanent magnets, facing the rotor, are formed at soft magnet pole shoes, which are passed through the end walls of the housing consisting of a non-magnetic material and are coupled outside of the end walls of the housing to in each case one pole of a permanent magnet.

12. The direct current machine of claim 11, wherein the pole shoes are formed from packages of transformer sheets held against one another tightly yet insulated electrically.

13. The direct current machine of claim 11, wherein the permanent magnets are formed in each case as rod magnets, the opposite ends of which are held, in each case, in one seat in the respective pole shoe formed at least partially in a complementary fashion to the end of the rod.

* * * * *